No. 839,662. PATENTED DEC. 25, 1906.
E. H. SMITH.
LEVEL.
APPLICATION FILED JAN. 24, 1906.
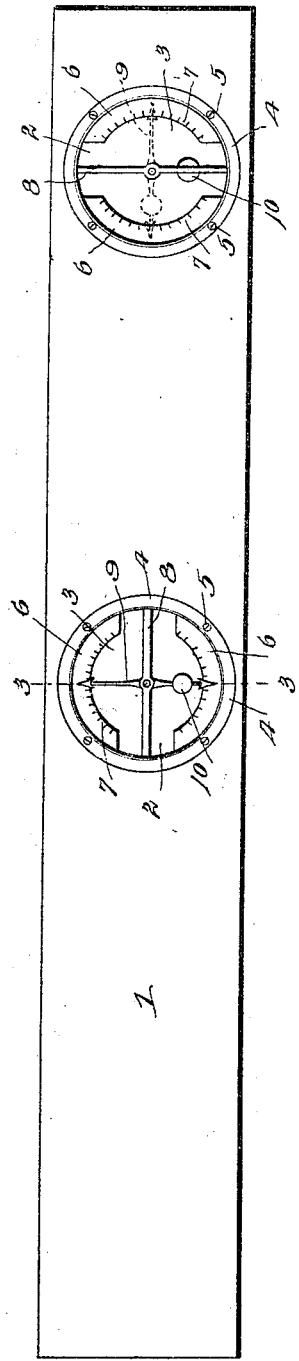
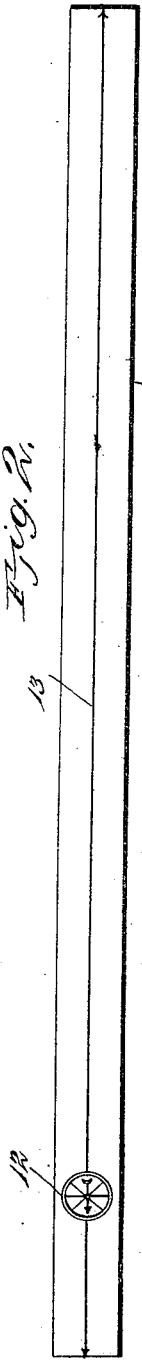
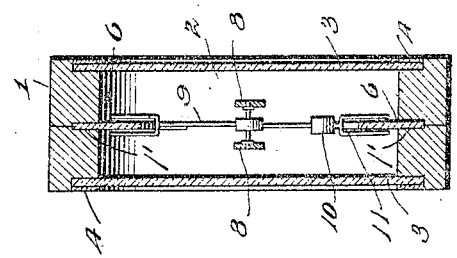
Witnesses
Frank Hough
Inventor
E. H. Smith.
By Victor J. Evans
Attorney

UNITED STATES PATENT OFFICE.

ELMER H. SMITH, OF BIRDS, ILLINOIS.

LEVEL.

No. 839,862.  Specification of Letters Patent.  Patented Dec. 25, 1906.

Application filed January 24, 1906. Serial No. 297,843.

*To all whom it may concern:*

Be it known that I, ELMER H. SMITH, a citizen of the United States, residing at Birds, in the county of Lawrence and State of Illinois, have invented new and useful Improvements in Levels, of which the following is a specification.

This invention relates to levels adapted for use in laying walls and foundations in building construction, and has for its objects to produce a comparatively simple inexpensive instrument of this character which may be conveniently utilized in ascertaining the level or plumb of a wall and also for obtaining the direction of the wall, one wherein the leveling and plumb members will move smoothly and freely and be effectually guided in their movements; and one in which the instrument may be conveniently read from either side and a double reading of each instrument be obtained.

With these and other objects in view the invention comprises the novel features of construction and combination of parts more fully hereinafter described.

In the accompanying drawings, Figure 1 is a side elevation of an instrument embodying the invention. Fig. 2 is a top plan view of the same. Fig. 3 is a cross-section, on an enlarged scale, taken on the line 3 3 of Fig. 1.

Referring to the drawings, the numeral 1 designates the body of the stock made in longitudinal sections, and on the inner faces of each section are cut-away portions which form recesses 1', the sections being secured together by any well-known means. The sections of stock when secured together are provided adjacent its longitudinal center and near one end with circular openings, which constitute chambers 2, which have their opposite sides closed by means of glass or other transparent material 3, said material being retained in place by metal rings 4, which are in turn secured to the stock by screws 5.

Centrally disposed within the chamber 2 and secured in the recess 1' is a pair of opposed segmental protractor-plates 6, each having on its opposite faces relatively corresponding graduations 7, while centrally disposed between the plates 6 and extended in line with the longitudinal axis of the stock is a pair of spaced bearing members or bars 8, having centrally pivoted therebetween a hand or pointer 9, provided at one side of its pivot with a weight 10, adapted for holding the member at all times in true vertical position and having each of its ends bifurcated, as at 11, to straddle the adjacent protractor 6 and to coöperate with the graduations on opposite sides thereof for indicating the level of the instrument. It is to be especially noted in this connection that owing to the pointer coöperating with both protractors provision is made for a double reading of the instrument and, further, that owing to the ends of the pointer being bifurcated to straddle the protractors the latter act as guides for the pointer in its movements and the instrument is at the same time adapted to be conveniently read from either side.

The stock 1 is provided adjacent one end with an opening or chamber 2, having therein graduated protractor-plates 6 and a pair of bearing-bars 8, between which is pivoted a hand or pointer 9, provided with a weight 10 and having bifurcated ends to straddle the protractor, the parts being all identical in construction and operation with the corresponding parts above described, except that the bearing-bars 8 are extended transversely of the stock and that the pointer is adapted for use in ascertaining the plumb of a wall or other portion of a structure.

Countersunk in one edge of the stock 1 is a compass adapting the instrument for setting the wall or foundation in the desired direction, there being drawn longitudinally of said edge of the stock a line 13, arranged in alinement with the north and south poles of the compass.

In using the instrument the member 9 at the center of the stock serves to indicate the true level of a wall or foundation, while the member 9 which is mounted adjacent one end of the stock is brought into plane for determining the plumb of the wall, it being particularly observed that any variation in the level or plumb of the wall will be shown by the movements of the pointers upon the protractors, and, further, that the instruments may be read from either side and also that a double reading on either side is rendered possible, owing to the provision of the two protractor-plates, with which the hands of the pointer coöperate, respectively. It will also be observed that because of the pointer being bifurcated at each end to straddle the adjacent protractors a steady movement of the pointer is insured, as heretofore explained.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is—

A level comprising a stock made in sections with recesses on their inner longitudinal faces, an opening in the stock, graduated segmental plates centrally arranged within the opening and secured in the recesses and having their ends spaced apart, a plurality of bearing-bars arranged at suitable distances apart and extending across the opening and secured between the ends of the plates, a weighted hand-indicator pivoted between the bars and having double pointers on its opposite ends to register respectively with the graduations on the opposite sides of said segmental plates, substantially as specified.

In testimony whereof I affix my signature in presence of two witnesses.

ELMER H. SMITH.

Witnesses:
W. H. PHILLIPPE,
S. R. FORD.